United States Patent [19]

Schaub et al.

[11] 4,320,662
[45] Mar. 23, 1982

[54] FAILURE DETECTION ANALYZER

[76] Inventors: Stanley R. Schaub, 11, rue Galgenberg, Junglinster; Peter Van Vliet, 5, Ave. Principale, Kahler, both of Luxembourg

[21] Appl. No.: 880,072

[22] Filed: Feb. 22, 1978

[51] Int. Cl.$^3$ .................................................. G01M 15/00
[52] U.S. Cl. .................................. 73/660; 364/518; 364/565
[58] Field of Search ............... 364/565, 518, 566, 520, 364/732; 73/660, 518, 116, 117.3, 117.2

[56] References Cited

U.S. PATENT DOCUMENTS

| | | | |
|---|---|---|---|
| 3,657,922 | 4/1972 | Sibend | 73/117.3 |
| 4,050,747 | 9/1977 | Ruhnau et al. | 364/565 X |
| 4,064,747 | 12/1977 | Rackliffe et al. | 73/116 |
| 4,071,892 | 1/1978 | Genzling | 364/565 X |
| 4,078,252 | 3/1978 | Schoenfeld et al. | 364/518 X |
| 4,179,922 | 12/1979 | Bouverie et al. | 73/116 |

*Primary Examiner*—Jerry W. Myracle
*Attorney, Agent, or Firm*—Wagner & Bachand

[57] ABSTRACT

A speed measuring device is provided for use as a diagnostic tool to analyze the sub-cyclic dynamic performance and to monitor the condition of moving elements within a mechanical or electromechanical system. Substantially instantaneous, absolute speed measurements are derived from elapsed time measurements between successive sensing of fixed, equal, position events such as generated by incremental position pulses of a shaft position encoder; said encoder being attached to one of the moving elements within the said system. An assessment of the dynamic performance and condition of the system is ascertained by comparing the speed profile with previous speed profiles obtained during normal system operation. Comparative differences in the said profiles provide an indication of changes of the driving and friction forces within the system which, in turn, can provide an indication of faulty elements.

6 Claims, 9 Drawing Figures

| ITEM | ω | T | Teeth | GTF |
|---|---|---|---|---|
| MOTOR(26) | 10.00 | 6.00 | | |
| GEAR(27) | 10.00 | 6.00 | 60 | 10 |
| GEAR(28) | 20.00 | 3.00 | 30 | 10 |
| GEAR(29) | ↓ | ↓ | 15 | 5 |
| GEAR(30) | ↓ | ↓ | 15 | 5 |

ω = Angular Velocity in RPM
T = Period for one Revolution
GTF = Gear Tooth Frequency = (ω) × (Teeth) / 60

FIG. 2 Con'd

FIG. 3 Con'd

* Expressed in 'G'

FAILURE DETECTION ANALYZER

FIELD OF APPLICATION AND PRINCIPLES SUPPORTING INVENTION

The present invention relates to a monitoring system and particularly to a system that is adapted to detect and record both steady state and incremental changes in the angular velocity of a device or system; the angular velocity being sampled many times each revolution to obtain high resolution data. The significance of the incremental velocity changes is the fact that they can be utilized as a parameter to detect and oftentime predict problems in a rotating device or system.

The principle of the detection and prediction capability is the fact that for any particular power setting to the input of the device or system, any incremental changes in the angular velocity which may occur throughout each revolution are indicative of a change in the internal or external forces on the device or system. In turn, these forces can generate or cause a change in the vibrational energy produced by the rotating device or system. Thus, the incremental changes of angular velocity can be considered as a function or index of the vibrational energy.

A practical example which demonstrtes the above concept is the meshing of two spur gears driven by a synchronous AC motor. Assume that both gears have 100 teeth. Further, assume that a tooth on the driving gear is broken and missing. Under these conditions, the velocity of the two gears will be constant for approximately 99% of the time. For approximately 1% of the time (at the location where the gear tooth is missing), a positive velocity transient ($\Delta\omega$) will occur on the driving gear and a negative velocity transient ($\Delta\omega$) will occur on the driven gear. During the transient period both vibration and noise will be generated to a degree dependent upon the gear speeds. Finally, if the spur gears are an integral part of a kinematic chain, a change in the angular velocity of the spur gears would normally be reflected to some degree in the other rotating elements within the chain.

The physical principles supporting the invention can be best described by way of the moment or torque equation (1) associated with the dynamics of a rigid body in rotation; the equation is shown below. Although the example is oversimplified, it nevertheless illustrates the basic theory of the invention in a clear manner.

$$\Sigma M_o = I_o \alpha = I(\Delta\omega/\Delta t) \qquad \text{Equation 1}$$

where
$\Sigma M_o$ = Sum of the moments acting on a rotating body at any instant (t) in lb-ft
$I_o$ = Mass moment of inertia of a rotating body about the axis of rotation in lb-sec$^2$-ft
$\alpha$ = Angular acceleration of a rotating body in rad/sec$^2$
$\Delta\omega$ = Change in angular velocity of a rotating body in rad/sec
$\Delta t$ = change in time in seconds.

Now for simplification purposes, the rotating system under test can be considered as a model representing a single rotating body (e.g. a gear) with a tangential force ($F_T$) acting upon it at a radius (R) as shown in equation 2. The product $F_T R$ being the sum of the moments which tend to either increase or decrease the angular velocity ($\omega$).

$$F_T R = I_o \alpha = I_o \Delta\omega \qquad \text{Equation 2}$$

The invention, in affect, measures the angular velocity ($\omega$) and changes in angular velocity ($\Delta\omega$) as a result of the tangential force ($F_T$).

An interesting aspect of the invention stems from a study of the kinetic energy equation of a rigid body in rotation as shown in equation 3.

$$K.E. = \tfrac{1}{2} I_o \omega^2 \qquad \text{Equation 3}$$

where
K.E. = Kinetic energy in ft-lbs
$\omega$ = Steady state angular velocity in rad/sec.

Assume that an element initially rotating at a constant angular velocity ($\omega$) begins to generate vibrations as the result, of say, a worn bearing. The resulting vibration can only occur at the expense of the angular velocity. That is, vibration energy is wasted energy and it can only be gained at the expense of the kinetic energy. Therefore, the vibrational energy at any instant emanating from the rotating element can be expressed as a change in kinetic energy as shown in equation 4 below.

$$E_V = \Delta KE = \tfrac{1}{2} I_o \Delta\omega^2 \qquad \text{Equation 4}$$

where
$E_V$ = Vibration energy in ft-lbs
$\Delta\omega$ = Instantaneous change in angular velocity in rad/sec.

Now, by applying the output of the invention to a micro-processor or computer the vibration energy generated by the system under test can be computed.

Experience has indicated that a single angular velocity measurement taken at a strategic test point, say a shaft position encoder of a missile guidance system, can normally provide sufficient data to indicate whether the operation and performance of the entire electromechanical chain is satisfactory. Further, from a single measurement it is also possible to isolate problems to an in-depth level; an example being a damaged tooth on a particular gear.

In conclusion, the invention has been designed, developed and put into practice. Further, three problems have been uncovered with the invention. In one case, a serious design problem was discovered in a guidance system of an aircraft which employed a "terrain following" radar. The latter two cases concerned large surveillance radars wherein mechanical problems associated with the rotating mechanism were predicted well in advance of catastrophic failure; in one case it was six months in advance of the failure and in the other case one year.

PRIOR ART

Heretofore, one method of detecting or predicting failures in rotating machinery has been by the acoustic technique; the most simple approach being the use of the "human ear". Specifically, as a mechanic or technician becomes experienced with an item of equipment, he also becomes sensitive to the various sounds generated by the equipment. In effect, he can oftentimes detect or predict certain problems by the magnitude and pitch of the sound. This technique can be enhanced by placing one end of a metal rod or screwdriver on the case of the machinery and the ear at the other end. From a scientific point of view the "human ear" technique has obvious disadvantages; one being that low level sounds go undetected and another being that the results are solely dependent upon the "ear" and experience of the technician.

A more-sophisticated approach to the acoustic technique is to place the test specimen into an array of microphones. The analog data derived from the microphones can then be converted to digital format, transmitted to an on-line computer for data analysis and finally the results can be displayed on a teletypewriter. This technique has a major disadvantage in that it is only suitable for experimental and production line testing.

Concerning the acoustic technique in general, there are two major disadvantages. One is the fact that the sound energy reaching the transducer is attenuated as it passes through the case or housing of the test specimen; it is further attenuated as it passes through the air medium. The other disadvantage is the fact that the sound energy reaching the transducer is composite in nature; that is, it consists of normal sound energy mixed with the sound energy emanating from the problem source. In order to differentiate between the two, elaborate filtering is normally required to perform an analysis.

In a second method for detecting or predicting failures in rotating machinery, linear accelorometers are attached to the test specimen. Specifically, the sensitive axes of the accelerometers are installed perpendicular to the X, Y and Z axes of the test specimen. The test results are normally analyzed by studying both the time-history of the analog signal and the spectral content of the waveforms. One of the major disadvantages of the accelerometer technique is the fact that the initial vibratory energy may be attenuated before reaching the accelerometers. This is especially the case when the rotating machinery is isolated by springs and dampers from its supporting element (i.e. foundation, case, etc.). For example, if an isolator is designed with a transmissibility factor of 0.2, then only 20% of the amplitude of the vibration is transmitted to the supporting element. Although the damping is, of course, beneficial for the system it, nevertheless, is a detriment when attempting to analyze or predict failures from the amplitude and frequency of the vibration. In effect, the isolators attenuate any vibration abnormalities which could be indicative of a problem.

Another disadvantage of the accelerometer technique is the fact that elaborate and costly test equipment is oftentimes required to both perform the tests and to analyze the test data. Further, the test analysis must be performed after the test and this can be a lengthy process.

Thus prior methods, heretofore, have involved the use of sound and vibration transducers for detecting or predicting failures. As has been noted, such systems and methods have inherent limitations and disadvantages. Accordingly, what is needed and what is provided, according to the present invention, is a combination which is capable of detecting or predicting problems at their source by way of angular velocity measurements of very high resolution. What is also needed and what is provided is a combination which can be easily connected to or installed within the rotating machinery (on a permanent basis, if desired) and which is capable of assessing the condition of the machinery at any desired time without interfering with its normal operation.

BRIEF DESCRIPTION OF THE DRAWINGS

The novel features which are believed to be characteristic of the invention, both as to organization and method of operation together with further objects and advantages thereof will be better understood with the accompanying drawings in which the preferred and alternate embodiments are illustrated by way of example. It is to be expressly understood, however, that the drawings are for the purpose of illustration and description only and are not intended as a definition of the limits of the invention.

FIG. 2, including FIGS. 2a and 2b, is a block diagram in greater detail, showing the analyzer of the present invention as applied to two test terminals of a system being monitored. It also includes typical graphic output recordings.

DETAILED DESCRIPTION OF THE INVENTION

Figure 1:
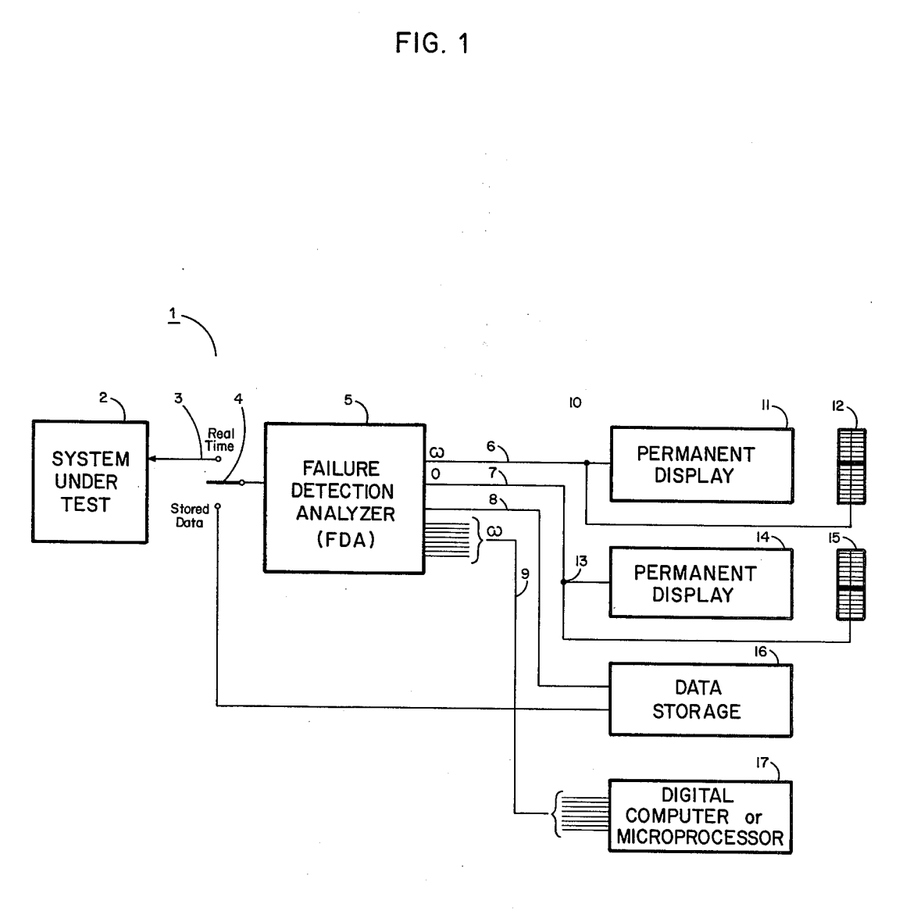
FIG. 1 is an overall block diagram of a system including a failure detection analyzer according to the present invention.

Turning first to FIG. 1, there is shown in block diagrammatical form a system (1) for detecting or predicting failures in rotating machinery. Shown as parts of the system (1) is the particular system under test (2), which is ultimately connected through a real time line (3) and a switch (4) of a failure detection analyzer (5). The outputs (6, 7, 8 and 9) of the failure detection analyzer (5) are applied to permanent displays (11 and 14), bar displays (12 and 15), a data storage device (16) and a digital computer or microprocessor (17). Alternately the bar displays (12 and 15) are considered as an integral part of the failure detection analyzer (5) but for ease in explanation, three blocks (5, 12 and 15) have been shown.

Four types of output signals are generated by the failure detection analyzer. Analog signal (6), the first signal, represents the angular velocity ($\omega$) of a pre-selected rotating element within the system under test (2). Analog signal (6) is applied to permanent display (11); the display may be, for example, a pen or oscillographic recorder. The output signal (6) is also applied to a bar display (12) by way of first terminal (10). The bar display (12) is composed of a series of light emitting diodes (LED's) and has a dual function. Firstly, it is utilized in the calibration process and secondly, it provides an instantaneous readout of the angular velocity ($\omega$) when the system under test (2) is in operation. In affect, the LED's illuminate in proportion to the deviation of the angular velocity ($\omega$) at any instant about a reference point.

Analog signal (7), the second signal, represents the angular acceleration ($\alpha$) of the same pre-selected rotating element within the system under test (2). The output signal (7) is applied to the second permanent display (14). The output signal is also applied to bar display (15) by way of second terminal (13). The second permanent display (14) and bar display (15) are identical to those associated with analog signal (6) previously discussed.

Analog signal (8), the third signal, is applied to a data storage device (16); the device may be, for example, a magnetic tape recorder. The output signal (8) recorded on the data storage device (16) is identical to that contained on the real time link (3) except for the fact the data is conditioned to insure compatibility with the data storage device (16). The purpose of analog signal (8) is to allow the original data to be stored such that it can be played back at a more convenient time after the test. In this mode of operation, the data storage device (16) applies the signal to the failure detection analyzer (5) by way of switch (4). Further, in the playback mode the analog signal (8) is inhibited.

Finally, a set of digital signals (9), in parallel format, is applied to a digital computer or microprocessor. The set of digital signals (9) also represents the angular velocity ($\omega$) of a pre-selected rotating element within the system under test. The applications of a digital computer or microprocessor (17) in conjunction with the failure detection analyzer (5) are numerous. One use may be, for example, to print out maximum angular velocity levels when pre-determined levels are exceeded. Although not shown in FIG. 1, a second set of digital signals representing the angular acceleration ($\alpha$) could be added as an additional channel to the digital computer or microprocessor (17).

In order to calibrate the system (1), a reference angular velocity ($\omega_c$) is generated by the failure detection analyzer (5). The calibration or reference value must be equal to the expected angular velocity ($\omega_t$) of the rotating element under test (2). More precisely, it must be the angular velocity ($\omega_c$) expected under perfect operating conditions. The calibration signal is applied to the various output devices (11, 12, 14, 15, 16 and 17).

The final step to the calibration process is to adjust the various output devices. Assuming that a pen recorder is utilized as the permanent recorder (11), then the pen is placed in the center of the recording paper and the correct gain is selected to ensure ample deflection of the pen in both the positive and negative directions. Concerning bar display (12), adjustments are made on the failure detection analyzer (5) such that the center LED illuminates as shown. The adjustments of the remaining output devices are not described herein, as this is considered as a, more or less, routine function.

When the system under test (2) is permitted to operate, the angular velocity ($\omega$) and acceleration ($\alpha$), as derived by the failure detection analyzer (5), are applied to the readout devices. Any deviation of the actual parameters from the calibration values may indicate a failure or incipient failure within the system under test (2).

Figures 2, 2A, 2B:
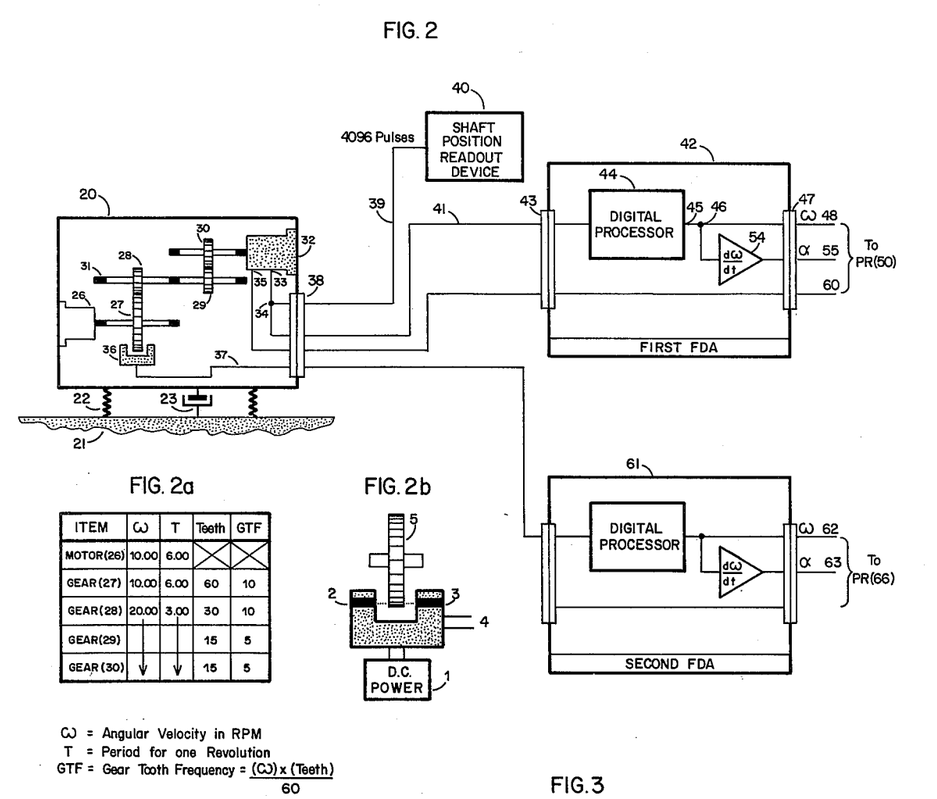
Figure 2:
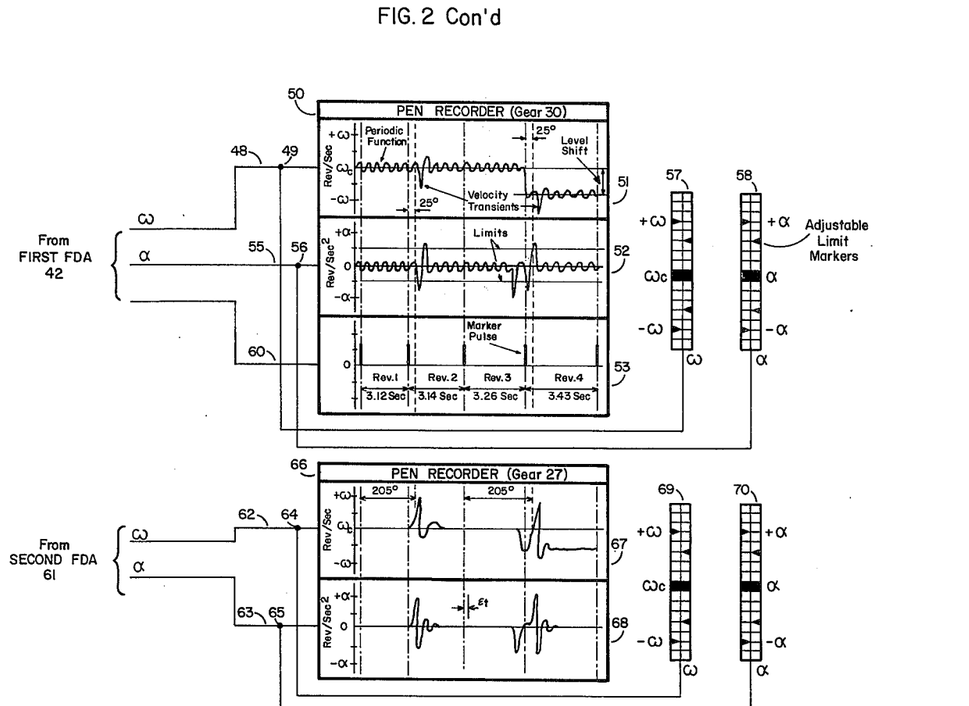
Figure 3:
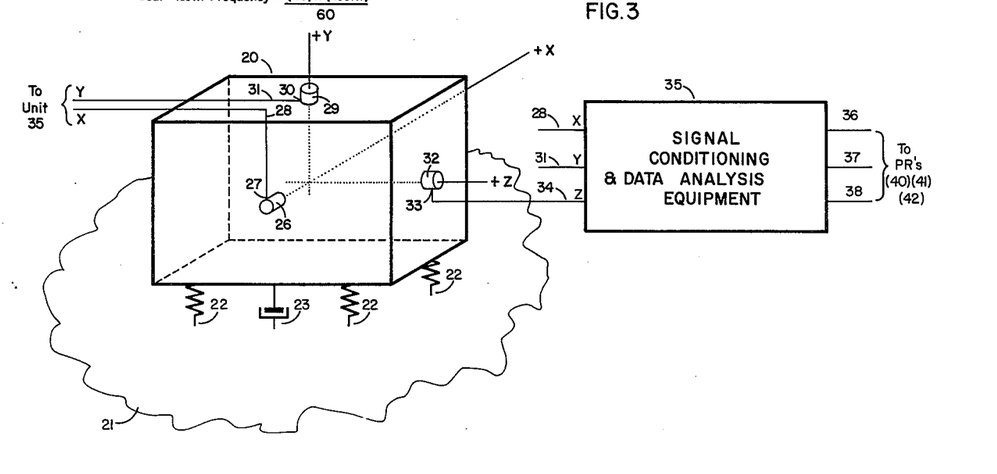
FIG. 3 is a block diagram of the same system being monitored as shown in FIG. 2, wherein accelerometers are used to acquire the data rather than the invention. It also includes typical output recordings which are used to compare with those provided by the invention in FIG. 2.

Turning next to FIG. 2 and FIG. 3 there is shown in detail two approaches for investigating the system under test. FIG. 2 shows the manner in which the system under test is analyzed with the invention whereas FIG. 3 shows the manner in which the system under test is analyzed with a prior art technique; namely vibration transducers. Comparing the two approaches in this manner allows a direct comparison to be made between the capabilities of each; in addition, the further objects of the invention can be more readily visualized and understood. For ease of discussion, only the analog signals applied to the pen recorders and bar displays are treated at this time.

Referring to FIG. 2, there is shown in detail a cutaway view of a typical system under test 20 attached to a rigid surface 21 by way of a vibration damping system consisting of springs 22 and a dashpot 23. Within the system under test 20, there is shown a constant speed electric motor 26 which drives a gear train consisting of four gears 27, 28, 29 and 30. The gear train and shafts are supported by six bearings; bearing 31 is typical of the six shown. The shaft position encoder 32 generates 4,096 equally spaced pulses during each revolution of gear 30; this is equivalent to 0.088°/pulse. The output signal 33 generated by encoder 32 is ultimately applied to the shaft position readout device 40 by way of a first junction 34, plug/socket 38, and cable 39. The combination of the encoder 32 and shift position readout device 40 is an integral part of the operational system and is not part of the invention. The combination may provide, for example, azimuth position data for a search radar.

The output signal 33 applied at the first terminal 34 is also applied to the digital processor 44 contained within the Failure Detection Analyzer (FDA) 42 by way of plug/socket 38, cable 41 and plug/socket 43. The digital process 44 derives angular velocity information from the output signal 33 from encoder 32. The output signal 45 derived from the digital processor 44 is ultimately applied to the first channel 51 of oscillograph 50, by way of second terminal 46, plug/socket 47 and cable 48.

The output signal 45 applied at second terminal 46 is also applied to a second channel 52 of oscillograph 50 by way of the differentiation circuit 54 and cable 55. The differentiation circuit 55 derives an angular acceleration parameter ($\alpha$) from output signal 45.

Finally, a second signal 35 from encoder 32 is applied directly to a third channel 53 of oscillograph 50 by way of plug/socket 38, cable 59, plug/socket 43, plug/socket 47 and cable 60. Signal 35 provides a marker pulse after each revolution of encoder 32. Signals at third terminal 49 and fourth terminal 56 are also applied to bar displays 57 and 58 respectively.

The utilization of a FDA in conjunction with a shaft position encoder is the preferred embodiment of the invention for two primary reasons. Firstly, high resolution speed data is, in principle, immediately available; that is, there is no requirement to install a transducer as it is already an integral part of the operational equipment. Secondly, a marker signal is available at the end of each revolution of the encoder. Shaft position encoders are commercially available from a number of firms; one being Litton Industries located in Canoga Park, California.

As an alternate embodiment of the invention, a second FDA 61 is utilized in conjunction with an optocoupler 36 contained in the unit under test 20. The optocoupler 36 is mounted around gear 27 but does not make physical contact with it. An output pulse 37 is generated from a optocoupler 36 each time a gear tooth interrupts a light beam generated by the device. For example, if gear 27 has 60 teeth, then 60 pulses are generated each revolution of the gear. Further, if gear 27 is rotating at 10 RPM, then pulses are established at a gear tooth frequency of 10 Hz; the gear tooth frequency being defined as the number of teeth passing a fixed point per second. The table at FIG. 2a provides, for the purposes of analysis, a tabulation of the angular velocity in RPM, the number of teeth and gear tooth frequency of all gears housed within the system under test 20; the rotational speed of the motor is also shown.

Turning next to FIG. 2b, there is shown in detail a typical optocoupler. The optocoupler is powered by a D.C. power device 1 which illuminates a light emitting diode (LED) 2. Finally, an infrared detector 3 detects the light energy emitted by the LED 2. When the light energy is interrupted, for example by a revolving gear 5, signals or pulses are generated at the output 4. Optocouplers are commercially available from a number of firms; one being Telefunken GMBH, located in Ulm, Germany.

Returning again to the unit under test 20, the output signal 37 of optocoupler 36 is ultimately converted into two signals from a second FDA 61. One signal, the angular velocity parameter ω, is applied to the first channel 67 of oscillograph 66 by way of cable 62. The second signal, the angular acceleration signal α is applied to the second channel 68 of oscillograph 66. Terminals 64, 65 also apply signals to the respective bar displays 69, 70. As the second FDA 61 operates in an identical manner as the first FDA 42, the discussion concerning the signal tracing is not repeated.

Turning now to FIG. 3 showing a typical prior art system, there is shown a system under test 20 in three dimensional perspective. Further, the system under test 20 is being monitored by vibration transducers along the X, Y, and Z axis by vibration transducers 26, 29 and 32 respectively. The unit under test in FIG. 2 and FIG. 3 are identical. However, for simplicity of explanation they are shown as separate units. Further, it is assumed that all data shown on recorders 50, 66 and 39 were collected on a concurrent or parallel basis.

The transducer signals 27, 30, and 32 are ultimately applied to channels 40, 41, and 42 respectively of pen recorder 39 by way of cables 28, 31, 34, the signal conditioning and data analysis equipment 35 and finally by way of cables 36, 37, and 38.

Figure 4:
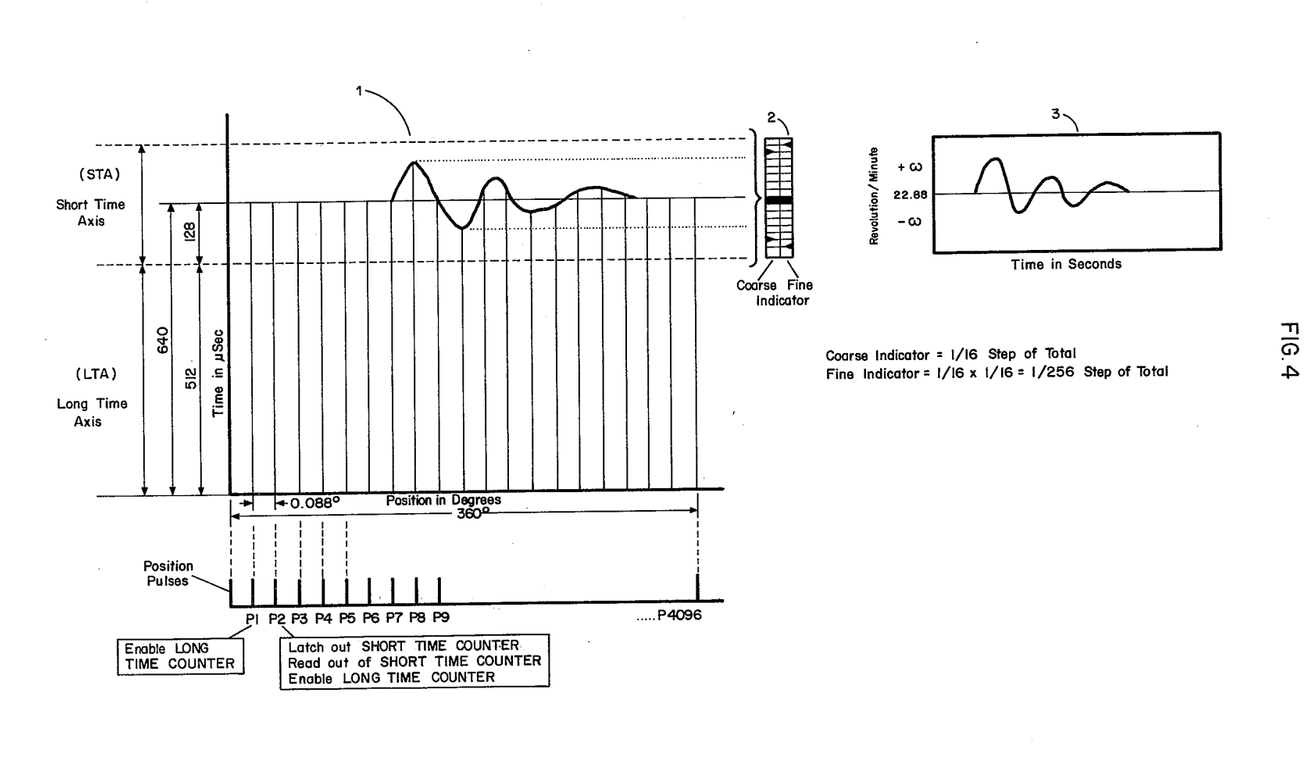
FIG. 4 is a graph displaying angular position of a shaft position encoder in degrees verses time in microseconds ($\mu$ sec.). The graph is utilized to describe the principle of the present invention.
Figures 5, 5A:
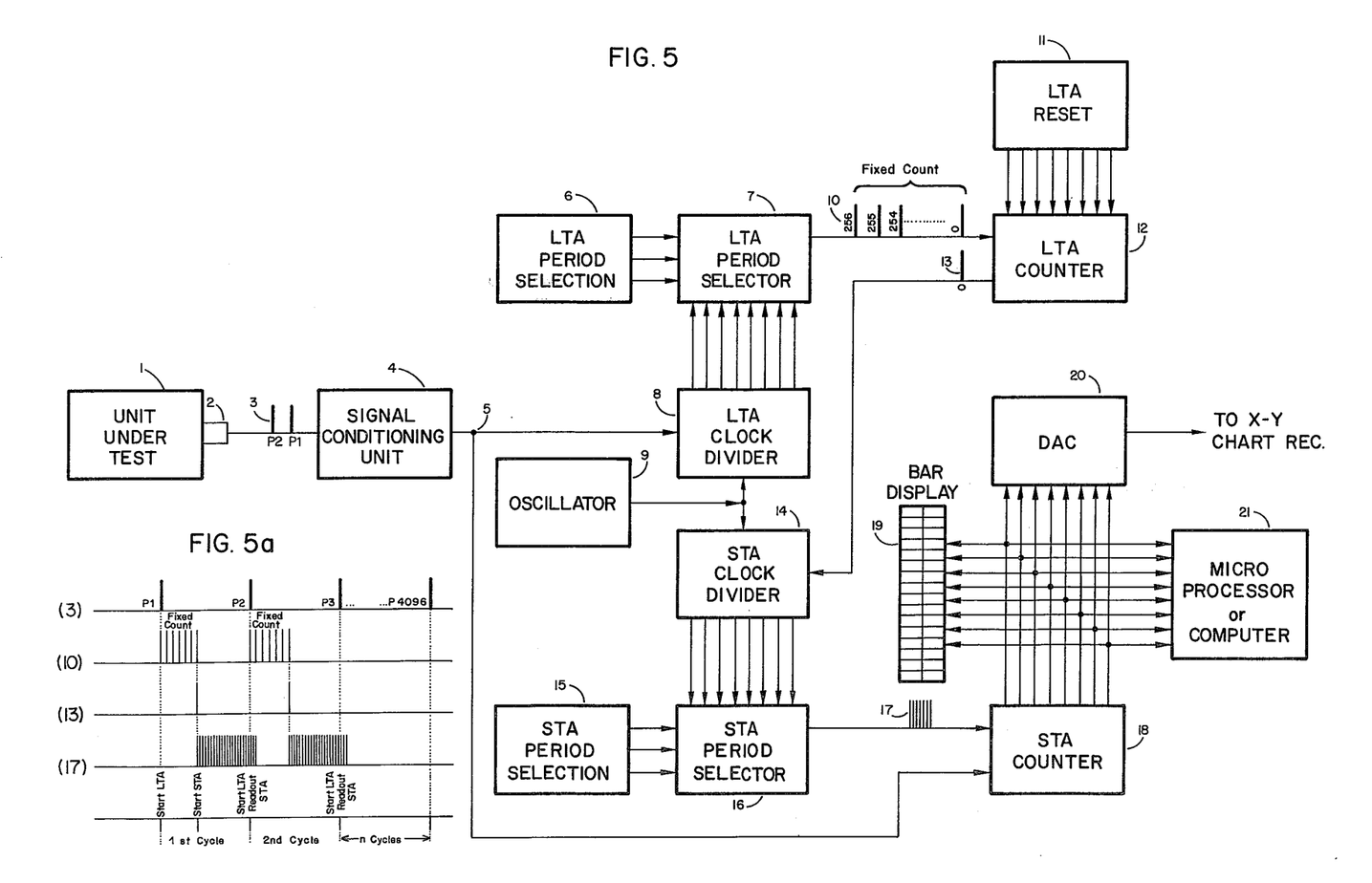
FIG. 5 is a detailed block diagram of the present invention.
FIG. 5a is a timing diagram of the pertinent waveforms shown in FIG. 5.

Referring now to FIG. 4 in conjunction with FIG. 5, there is shown in FIG. 4 a graph 1 with two coordinates. The horizontal coordinate represents the shaft position of the digital encoder while the vertical coordinate represents time in microseconds (μsec). All values indicated on the chart are for example purposes in order to demonstrate the general operation of the invention.

Concerning the position axes of the graph, the value of 0.088° represents the angular position between any two position pulses of a shaft position encoder wherein 4096 pulses equals one revolution of the encoder. The angular position between all pulses is physically fixed at 0.088°.

Concerning the time axis of the graph, it is divided into two sectors; one sector is termed the lone time axis (LTA) and the other is termed the short time axis (STA). The lengths of the LTA and STA are established by a series of switches 7 and 16 located on the failure detection analyzer of FIG. 5. The calibration process consists of selecting switch settings such that the expected steady state angular velocity of the system under test, expressed in microseconds (μsec) lies in the middle of the STA as shown on FIG. 4. As indicated on the time axis of graph 1, the sum of LTA and STA is 640 μsec; this is equivalent to an encoder velocity of 22.888 rev/min.

Associated with the STA in FIG. 4 is a bar display 2. It consists of two strings of sixteen LEDs each. The left string is a coarse readout and covers 1/16 of the time window per LED. The right string is a X 16 magnification of the coarse readout and covers 1/256 of the time window per LED. When the encoder acquires a constant angular velocity of 22.888 rev/min, then the center LED of both bar displays illuminate. If the angular velocity of the encoder deviates from 22.888 rev/min then, each LED in turn, will track the instantaneous amplitude deviation.

The bar display has a twofold purpose. Firstly, it is an integral part of the calibration process. Secondly, it can be utilized in automatic test equipment (ATE) to indicate when dangerous levels have been exceeded. Mechanical markers on both strings of LEDs can be preset to indicate the angular velocity limits. It is pointed out that the bar display for the angular acceleration parameter shown on FIGS. 1 and 2 is not shown on FIG. 4. However, the operation is identical to that of bar display 2.

When the invention also drives a pen recorder 3, then the constant angular velocity of 22.888 rev/min is established as the center line of the recorder.

For ease of explanation, the electrical pulses ($P_1$, $P_2$. . . ) generated by the shaft encoder are shown directly below the time axis on graph 1. The invention is triggered and operates from these pulses. When the first pulse $P_1$ is sensed by the invention, a countdown action is initiated by a preset delay counter termed the long time counter (LTC) 12 of FIG. 5; this establishes the long time axis (LTA) as shown on graph 1. The LTC can be preset to a number of values (to be described). Assuming that a cutdown from 256 to 0 occurs and the period between each count is 2 μsec, then the value of the LTA is the product of the two values or 512 μsec.

When the long term counter LTC attains zero (0) count, an upcount action is initiated. The counting device is termed the short time counter STC 18 of FIG. 5 and it establishes the value of the short time axis (STA). The count continues until pulse $P_2$ is sensed by the invention. When $P_2$ is sensed, the STC is latched out and the counter state is readout as a byte consisting of eight bits. In parallel with the latter operation, the long term counter LTC is again enabled and the cycle is repeated.

Assuming that a count of 128 occurs on the STC 18 and the period of each count is 1 μsec as indicated on FIG. 4; then the value of the short term counter STA 18 is the product of the two values 128 μsec. Finally, the total time stored between $P_1$ and $P_2$ is the sum of the counts in the long term counter LTA 12 and the short term counter STA 18 which is 640 μsec or 22.888 rev/min.

Referring to FIG. 5, there is shown a general block diagram of the present invention. For those skilled in the art of digital circuit design, the diagram is sufficiently clear to fully describe the operation of the invention.

There is shown in FIG. 5, the system under test 1 including the digital encoder 2. When the system under test 1 is in operation, a pulse train 3 is generated from the encoder 2. There is shown in FIG. 5a, a timing diagram of all essential wave shapes associated with the invention. As indicated, the pulse train 3 consists of 4096 pulses per revolution of encoder 2.

The encoder pulse train 3 is applied to the signal conditioning unit 4. The circuitry within the unit conditions the encoder pulse train 3 such that it becomes fully TTL-compatible.

The output signal from the signal conditioner unit 4 is applied to the LTA clock divider 8 and the STA counter 18 by way of terminal 5. The oscillator 9, LTA clock divider 8, LTA period selection 6, and LTA period selector 7 produces a pulse train 10 with a constant PRF. The pulse train 10 is then applied to the LTA counter 12 which is a cutdown device; the LTA counter 12 is preset by the LTA preset 11.

When a countdown from, say 256 to 0, is attained from the LTA counter 12 as represented by pulse train 13, then the STA clock divider 14 is triggered which initiates the STA. The oscillator 9, STA clock divider 14, STA period selection 15, and STA period selector 16 produce a pulse train 17 with a constant PRF. The count continues until encoder pulse $P_2$ is sensed. The STA counter 18 is then latched out and the counter state is readout into the bar display 19, the digital to analog converter (DAC) 20 and the microprocessor or computer 21.

In summary, pulse $P_1$ from the encoder initiates a preset countdown action. When "0" count is reached, an upcount action is initiated. When pulse $P_2$ from the encoder 2 is sensed, the count is latched out and the state of the counter is readout. In parallel with the counter latch-out the preset countdown action is again initiated and the cycle is repeated.

In conclusion, there are a number of computer/software options which can be utilized with the invention. One option consists of providing an automatic printout whenever a preset level of angular velocity and acceleration are exceeded; the preset level indicating a hazardous region. Another option consists of deriving the angular acceleration parameter ($\alpha$) by computation rather than by the differentiation device (54) as indicated in FIG. 2.

TYPICAL ANALYSIS OF TEST DATA

There are a number of objects of the invention. For ease of explanation the primary objects of the invention are described and precised by way of a typical data analysis utilizing hypothetical test data.

Turning again to FIGS. 2 and 3, there is shown three pen recorders 50, 66, and 39. The data presented on the recorder channels are illustrative only and represent the manner in which typical test data are recorded. Concerning the data on the channels, four topics are treated in the following analysis; they are, the marker pulse, the periodic function, the velocity transient and the level shift. These four items are identified on channel 51 of recorder 50.

Analysis of Marker Pulses

For the purpose of analysis, a common time base in seconds is established for all channels contained on recorders 50, 66 and 39. A time slice of typical data is shown on the channels of recorders 50, 66, and 39. As shown on channel 53 of pen recorder 50, the time slice contains five marker pulses associated with gear 30; one marker pulse being generated for each revolution of the gear. Only gear 30 generates marker pulses within the system under test 20; it generates the pulses by way of digital encoder 32. In order to establish reference points on the channels of recorders 66 and 39, the marker pulses from channel 53 are utilized. This is accomplished by extending the marker pulses, by way of vertical dotted lines, through all traces.

Upon inspecting the marker pulses further, it is indicated that the period of each varies slightly from one to another; that is, from 3.12 to 3.43 seconds. Further, the values also exceed the ideal value of 3.00 seconds shown on the table in FIG. 2a. This condition alone may indicate a potential problem. In theory, the time between all pulses should be 3.00 seconds in order to attain constant velocity conditions. However, if there are errors in the gears, due to fabrication process or damage, as well as elasticity in the system, the velocity of the gears will vary, thus the period of the revolution.

For the purposes of example, no marker pulses are generated by the optocoupler for gear 27. Although a mechanical method could be devised for accomplishing this, it was not included for the purpose of demonstrating that various conclusions concerning gear trains can still be made even when certain marker pulses do not exist.

Now, as the gear ratio between gear 27 and 30 is 2:1, then in principle, two marker pulses of gear 30 would be required to establish one revolution for gear 27. Based upon this, the period of each revolution of gear 27 is shown on channel 68 as the time between two marker pulses; further, two revolutions of gear 27 are shown.

It is pointed out that, if gear 27 did generate its own marker pulses, they would likely differ, by a slight time error ($\epsilon_t$), from the corresponding marker pulses of gear 30. Again the time difference would be attributed to gear tooth error associated with gears 27 and 30 and system elasticity. The time errors ($\epsilon_t$) associated with the marker pulses, assuming they existed for gear 27 are shown on channel 68 of recorder 66.

Referring to FIG. 3 representing the prior art, a major disadvantage of the vibration transducer technique is the fact that no marker pulses are produced which are associated with the rotating elements within the system under test 20. In order to effectively detect or predict problems within rotating machinery, there are two primary requirements. Firstly, a means must be available to determine the period of revolution of each rotating element as demonstrated in the above example. Secondly, a means must be available to indicate the exact angular position of a key event(s) within a revolution of any rotating element. Several examples of this latter point are demonstrated in the analyses which follows.

Therefore, it is an object of the invention in combination with a shaft position encoder, to provide a means for determining the period of revolution for each rotating element within a system under test.

Analysis of the Periodic Function

Shown on channel 51 of recorder 50 is a continuous periodic waveform which represents the angular velocity of gear 30; the waveform is present during the four revolutions in spite of the velocity transients and level shift phenomena. For simplicity of analysis, assume that the waveform approaches that of a sine-wave. Although the waveform is not drawn to the proper time scale because of space constraints, assume further that 15 cycles of the sine-wave occur between the first two marker pulses of gear 30; in this case the gear tooth frequency (GTF) is 5 Hz.

It can be hypothesized that the periodic waveform is attributed to minute angular velocity changes ($\Delta\omega$) associated with the meshing action of gear pair 29 and 30; the velocity changes ($\Delta\omega$) could be as minute as 1 part in 10,000 or greater. This hypothesis is supported by one of the fundamental laws of gearing. The law states that errors on gear teeth profiles caused by inaccuracies of production, spacing, misalignments in mounting and tooth deflection under load result in velocity changes which produce dynamic forces on the teeth greater or less than the transmitted force. The amount of load variation depends largely upon the effective mass of the gears, the extent of the effective error, the speed of the gear and torque load.

Now, the angular acceleration ($\alpha$) associated with the periodic function is shown on channel 52 of recorder 50. Based upon the laws of calculus, the angular acceleration is defined as the first derivative ($d\omega/dt$) of the angular velocity ($\omega$). As the angular velocity is assumed to be a sine-wave function, then it follows that the angular acceleration of the example must be a cosine-wave.

The angular acceleration, as shown on channel 52, is useful in determining whether pre-established acceleration limits are being exceed. As indicated, the limits on gear 30, due to the gear tooth frequency of 5 Hz, are not exceeded.

Now refereing to recorder 66, the angular velocity and acceleration for gear 27 are shown on channels 67 and 68. As indicated on channel 67, there is no frequency with a value of 10 Hz; this value being the GTF of gear 27 as shown on the table in FIG. 2a. From this, two conclusions can be drawn. Firstly, there is no perceptible gear error associated with gear 27. Secondly, gear 30 is operating under a very low level load. This follows because gear 30 only drives an encoder which requires negligible torque at operating speed. If, however, gear 30 were driving a heavier load, the GTF of 5 Hz associated with gear 30 would also be reflected to some degree back into gear 27; that is, a GTF of 5 Hz would be recorded on channel 67.

Finally, if both gears 27 and 30 each possessed gear tooth errors of 10 Hz and 5 Hz respectively, then a composite waveform would be generated by both gears. The resultant waveform would be a summation wave containing the two frequencies. Further, if the GTF of any two gears are nearly the same and if there are gear errors present, then a beating affect would occur. The frequency of the beat would be the difference between the GTF of the two gears and the amplitude of the waveform would be a periodic variation in amplitude of a summation wave.

In comparing the angular velocity and acceleration data of recorder 50 with that of the vibration data on recorder 39, it can be observed that there is no visual relationship; the reason being that the nature of the data is fundamentally different.

In the case of the angular velocity and acceleration data, as provided by the invention, the parameters are directly proportional to the resultant of three effective forces (Fe) along the X, Y and Z axis. Of importance is the fact that these forces (Fe) exert a direct influence on the parameters themselves; the forces may be either vibratory and/or steady state in nature or a combination of both. In other words, the invention is totally insensitive to forces which do not tend to increase or decrease the angular velocity and/or acceleration. Therefore, the invention can be considered as a very sensitive automatic tracking filter which remains permanently tuned, without phase lag, to the resultant force $(Fe)_R$ of the three effective foreces (Fe). Further, since there is no phase lag associated with the "filter", the three dimensional picture always remains undistorted.

In the case of the vibration data, the accelerometers are sensitive to all vibratory forces which are in line with their sensitive axes, whether they be internal to the system under test; an example of an external force may be, for example, in-flight vibrations of an airplane. As can be seen from the foregoing, the vibratory forces of interest can become easily masked in the data thus requiring a high degree of filtering before becoming useful.

Of prime importance concerning vibration data, is the fact that the data not a direct function of the system dynamics; it is merely a reflection or mirroring of certain characteristics of the dynamics.

Based upon the above discussion, it can be seen that the prime object of the invention is to derive an angular velocity and acceleration of a rotating element in real-time such that the performance and operation of a rotating system can be immediately evaluated or shortly thereafter.

It is, also, another object of the invention to provide a real-time visual readout indicating when pre-selected rotating elements within a system under test exceed angular velocity and acceleration levels of a dangerous nature.

It is, yet, an object of the invention to provide a means of analyzing errors on gear teeth profiles caused by inaccuracies of production, spacing, misalignments in mounting and tooth deflection under load.

Finally, it is another object of the invention to provide a system which can function without interfering with the normal operation of the system under test.

Analysis of the Velocity Transients

As shown on channel 51 of recorder 50, two negative velocity transients occur 25° after the second and fourth marker pulses of gear 30. This phenomenum may, for example, represent a deformed gear tooth somewhere in the gear train. As the transient did not occur on every revolution of gear 30, it can only be concluded that the damage is associated with gear pair 27 and 28. Further, the fact that the transient value is negative signifies that an instantaneous power reduction occurred from a driving source; again, this could only to gear pair 27 and 28.

By inspecting channel 67 of recorder 66, the above hypothesis is confirmed from two standpoints. Firstly, a positive velocity transient occurs at the same point in time during each revolution of gear 27. Secondly, the positive value of the transient indicates an increase in the angular velocity of the gear at the time of meshing action.

In comparing the angular velocity and acceleration date of recorder with that of the vibration data on recorder 39, representing the prior art, it can again be seen that there is no visual relation between the data. Again, only after a long and tedious data reduction and analysis can any meaningful data be extracted from the vibration data shown on recorder 39. Further, it would be difficult to locate the exact position of the broken tooth as no marker pulses are available.

Analysis of the Level Shift ($\Delta\omega$)

On channel 51 of recorder 50 there is shown a level shift ($\Delta\omega$) in the angular velocity ($\omega$) of gear 30. This phenomenon can be attributed to two possible causes. Firstly, it can represent a constant friction or braking force in the system. An example of such a force may be a bearing seizure due to lack of lubrication. Secondly, it can represent a loss of power in the prime power; in reference to the example, it would be the electric motor.

One of the more important objects of the invention is the fact that steady state level shifts in the angular velocity ($\omega$) is continuously provided. It is impossible to provide such information from linear accelerometers.

Accordingly, while the invention has been particularly shown and described with reference to the preferred embodiments, it will be understood by those skilled in the art that various changes in form and detail may be made therein without departing from the spirit and scope of the invention.

What is claimed as new is:

1. An apparatus for providing measurements indicative of substantially, instantaneous absolute speed of a rotating element which is a member of a mechanical or electro-mechanical apparatus comprising:
   (a) speed sensing means coupled to said rotating element and responsive to rotation thereof through indicative, small angles of revolution of said rotating element for generating a signal for each occurrence of small angle rotation thereof, said angles each being a fraction of a full-cycle of operation (i.e. one revolution);
   (b) means responsive to at least one said signal for providing an indication of one revolution of said rotating element;
   (c) signal processing means responsive to successive pair of said small angle rotation signals for providing elapsed time measurements between said small angles;
   (d) additional signal processing means for providing substantially, absolute speed indication measurements on a small angle signal by small angle signal basis from successive elapsed time measurements, the said absolute speed measurements being inversely proportional to the said elapsed time measurements and being expressed in dimensions of degrees per unit of time; whereby anomalies in said apparatus at sub-cyclic intervals may be detected.

2. An apparatus according to claim 1 wherein said signal processing means for providing said elapsed time comprises:
   (a) a counter for providing an automatic downcount, upcount, or combination thereof, to provide one or a consecutive number of pulse trains;
   (b) clock means for providing a constant, preselectable pulse period for each said pulse trains;
   (c) a means for initiating the first pulse of the first or only pulse train in response to a first of a successive number of said signals provided by the occurrence of a first said small angle indication;
   (d) a means for terminating the final count of the last or only pulse train in response to a second or a successive number of said signals provided by the occurrence of a second said small angle indication:
   (e) a means for simultaneously providing a readout of the state(s) of said counter and reinitiating the next and successive cycles, whereby
   (f) said cycles are indicative of the elapsed time, whereby p1 (g) said elapsed time of each said pulse train is equal to the product of the said pulse period and the total pulse count and whereby
   (h) total elapsed time is equal to the sum of the elapsed time of each said pulse train.

3. An apparatus for providing measurements of substantially, instantaneous absolute speed of a machine element moving in a linear fashion which is a member of a mechanical or electromechanical apparatus comprising:
   (a) speed sensing means responsive to linear motion through seccessive small distance of said machine element for generating a signal for each occurrence thereof; said distances each being a fraction of a full-cycle of operation;
   (b) means responsive to at least one said signal for providing an indication of one full-cycle of operation of operation of the said machine element;
   (c) signal processing means responsive to successive pairs of said signals for providing elapsed time measurements between said small distances;
   (d) additional signal processing means for providing substantially, absolute speed indication measurements on a signal by signal basis from successive elapsed time measurements, the said absolute speed measurements being inversely proportional to the said elapsed time measurements and being expressed in dimensions of linear displacement per unit of time whereby anomalies at subcyclic intervals may be detected.

4. A system for detecting anomalies in a mechanical system subject to cyclical movement comprising:
   sensor means for measuring a plurality of increments of motion of one element of said mechanical system less than a full cycle of motion of the said one element;
   means for sensing a full cycle of said one element;
   means for calculating the instantaneous velocity of said one element for each increment of motion;
   means for comparing the instantaneous velocity of each succeeding increment of motion with the previous increment of motion; and
   means for registering differences between successive instantaneous velocities as anomalies in the mechanical system.

5. The combination in accordance with claim 1 including means for registering a series of differences during at least one full cycle to identify the relative location of anomalies detected as a function of the full cycle of said element.

6. The combination in accordance with claim 1 including means for displaying any cyclical occurance of anomalies as detected to determine the location of the anomalies in the mechanical system as a function of the cycles of operation of other elements of the mechanical system than the said one element.

* * * * *